US011036007B2

(12) United States Patent
Gonthier et al.

(10) Patent No.: US 11,036,007 B2
(45) Date of Patent: Jun. 15, 2021

(54) FIBER CLEAVER

(71) Applicant: TECHNOLOGIES O'FIBERTY INC., Outremont (CA)

(72) Inventors: François Gonthier, Outremont (CA); Jean-Charles Gonthier, Neuchâtel (CH)

(73) Assignee: TECHNOLOGIES O'FIBERTY INC., Outremont (CA)

( * ) Notice: Subject to any disclaimer, the term of this patent is extended or adjusted under 35 U.S.C. 154(b) by 0 days.

(21) Appl. No.: 16/309,624

(22) PCT Filed: Jun. 15, 2017

(86) PCT No.: PCT/IB2017/053563
§ 371 (c)(1),
(2) Date: Dec. 13, 2018

(87) PCT Pub. No.: WO2017/216753
PCT Pub. Date: Dec. 21, 2017

(65) Prior Publication Data
US 2019/0331856 A1 Oct. 31, 2019

Related U.S. Application Data

(60) Provisional application No. 62/350,782, filed on Jun. 16, 2016.

(51) Int. Cl.
*G02B 6/25* (2006.01)
(52) U.S. Cl.
CPC ...................................... *G02B 6/25* (2013.01)
(58) Field of Classification Search
CPC ....................................................... G02B 6/25
See application file for complete search history.

(56) References Cited

U.S. PATENT DOCUMENTS

| 4,017,013 A | 4/1977 | Hawk et al. |
| 4,039,309 A | 8/1977 | Albanese et al. |
| (Continued) |

FOREIGN PATENT DOCUMENTS

| EP | 810455 | 12/1997 |
| GB | 147577 | 5/1985 |
| (Continued) |

OTHER PUBLICATIONS

Written Opinion of the International Searching Authority issued by the World Intellectual Property Organization dated Aug. 31, 2017 for PCT application PCT/IB2017/053563 from which the present application claims priority.
(Continued)

*Primary Examiner* — Kenneth E Peterson

(57) ABSTRACT

A fiber cleaver (100) for cleaving an optical fiber (106). A monobloc fiber handling element (116) defines a pair of spaced apart fiber holding portions (120) each defining an elongated fiber receiving aperture (122) for receiving a respective part of the optical fiber (106) thereinto. The fiber handling element (116) is deformable between open, closed and tensing configurations. In the open configuration, the fiber receiving apertures (122) extend coaxially and the fiber receiving apertures (122) have an open width. In the closed configuration, the fiber receiving apertures (122) have a closed width smaller than the open width. In the tensing configuration, the fiber receiving apertures (122) have the closed width and an inter-aperture distance is larger than in the open and closed configurations. An actuator (104) is operatively coupled to the fiber handling element (116) for moving the latter between the open closed and tensing configurations. A cutter (114) is provided adjacent the gap (124) between the fiber receiving apertures (122).

26 Claims, 8 Drawing Sheets

(56) References Cited

U.S. PATENT DOCUMENTS

| | | | |
|---|---|---|---|
| 4,074,840 A | 2/1978 | Fulenwider et al. | |
| 4,154,385 A | 5/1979 | Lewis | |
| 4,159,793 A | 7/1979 | Belmonte et al. | |
| 4,229,876 A | 10/1980 | Doty | |
| 4,257,546 A | 3/1981 | Benasutti | |
| 4,322,025 A | 3/1982 | Johnson | |
| 4,445,632 A | 5/1984 | Margolin et al. | |
| 4,552,290 A | 11/1985 | Szostak | |
| 4,557,049 A | 12/1985 | Cribbs et al. | |
| 4,644,647 A | 2/1987 | Szostak et al. | |
| 4,688,707 A * | 8/1987 | Szostak | G02B 6/25 225/106 |
| 4,790,465 A | 12/1988 | Fellows et al. | |
| 4,893,892 A * | 1/1990 | Ziemek | G02B 6/25 385/96 |
| 5,121,456 A | 6/1992 | Essert et al. | |
| 5,188,268 A | 2/1993 | Hakoun et al. | |
| D334,734 S | 4/1993 | Essert et al. | |
| 5,213,244 A | 5/1993 | Curtis et al. | |
| 5,382,276 A | 1/1995 | Hakoun et al. | |
| 6,244,488 B1 | 6/2001 | Tanaka | |
| 6,578,747 B2 | 6/2003 | Murgatroyd | |
| 6,661,962 B1 | 12/2003 | Calvet et al. | |
| 7,377,703 B2 | 5/2008 | Weynant | |
| 7,454,117 B2 | 11/2008 | Carpenter et al. | |
| 7,689,091 B1 | 3/2010 | Christman | |
| 8,366,328 B2 | 2/2013 | Chen et al. | |
| 8,831,391 B2 * | 9/2014 | Suematsu | G02B 6/3825 385/123 |
| 9,885,833 B2 * | 2/2018 | Vallance | H02G 1/12 |
| 10,663,664 B2 * | 5/2020 | Nishioka | G02B 6/245 |
| 2005/0063645 A1 | 3/2005 | Carpenter et al. | |

FOREIGN PATENT DOCUMENTS

| | | |
|---|---|---|
| JP | 55055306 | 4/1980 |
| JP | 55060035 | 5/1980 |
| JP | 55082938 | 6/1980 |
| JP | 55144444 | 11/1980 |
| JP | 56102805 | 8/1981 |
| JP | 57008503 | 1/1982 |
| JP | 60184207 | 9/1985 |
| JP | 61294403 | 12/1986 |
| WO | 1996033430 | 10/1996 |

OTHER PUBLICATIONS

International Search Report issued by the World Intellectual Property Organization dated Aug. 31, 2017 for PCT application PCT/IB2017/053563 from which the present application claims priority.

* cited by examiner

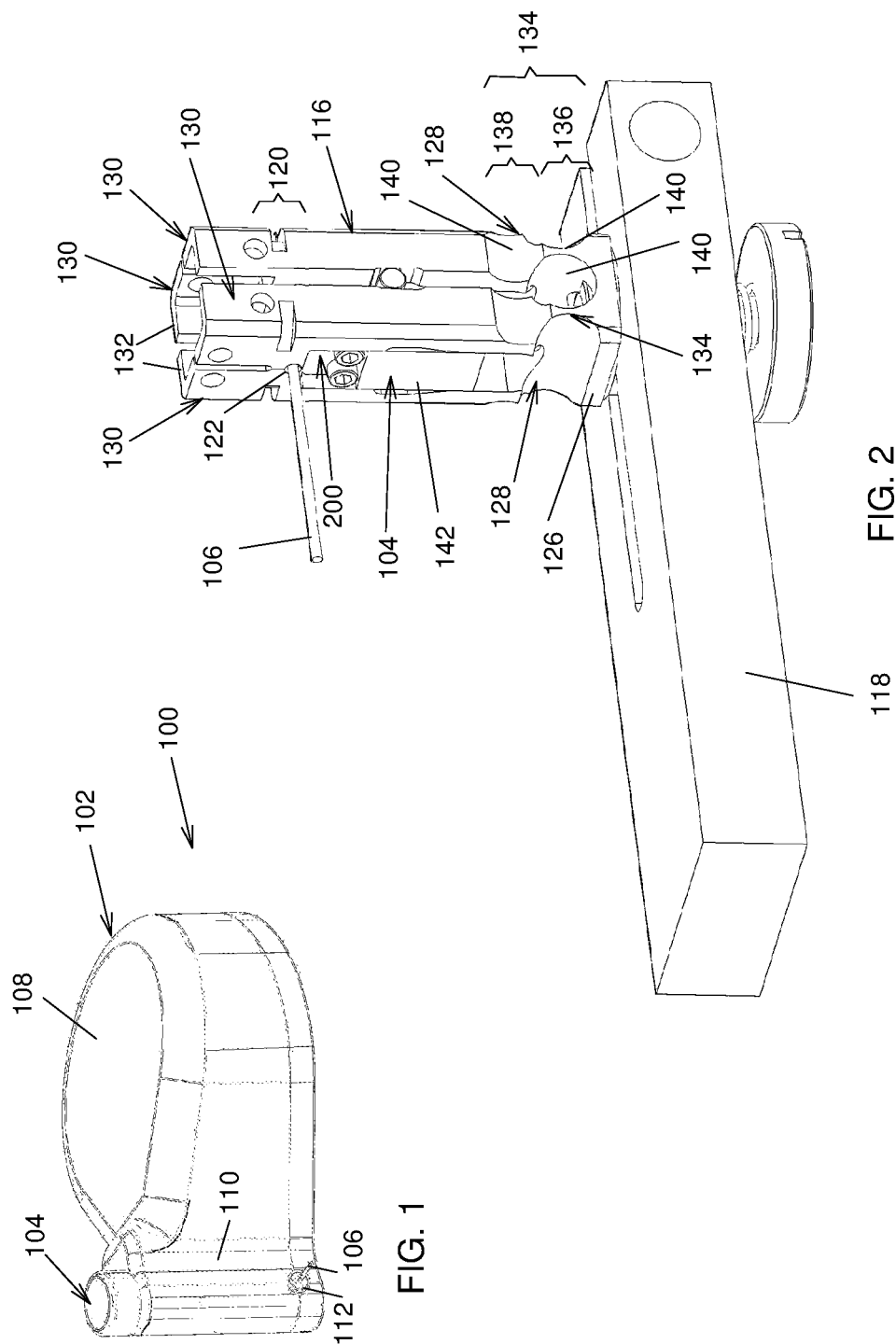

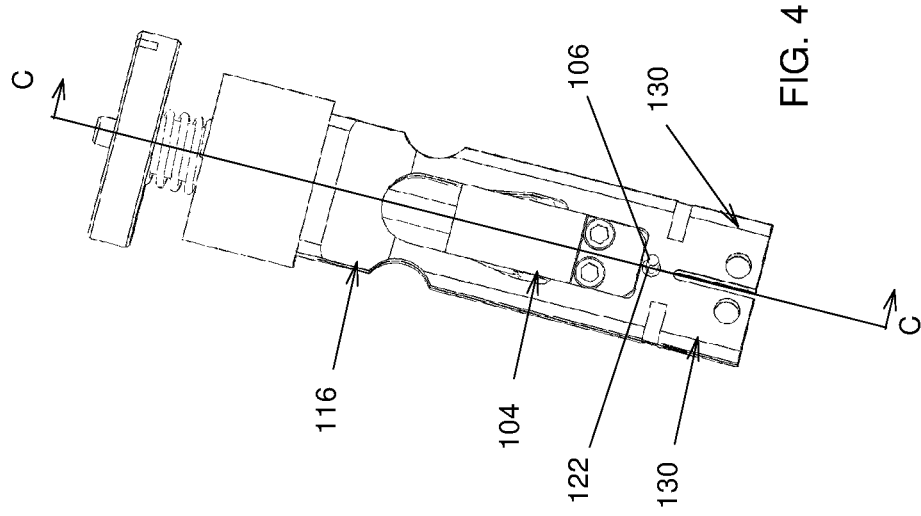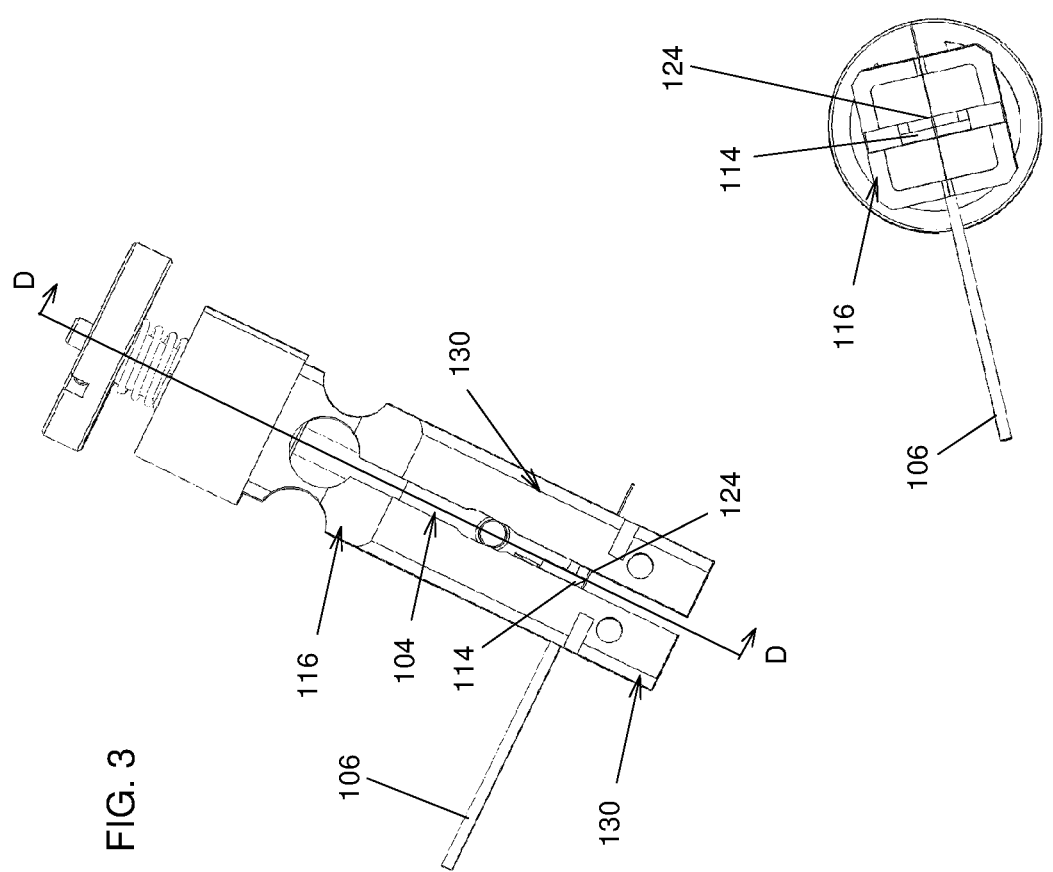

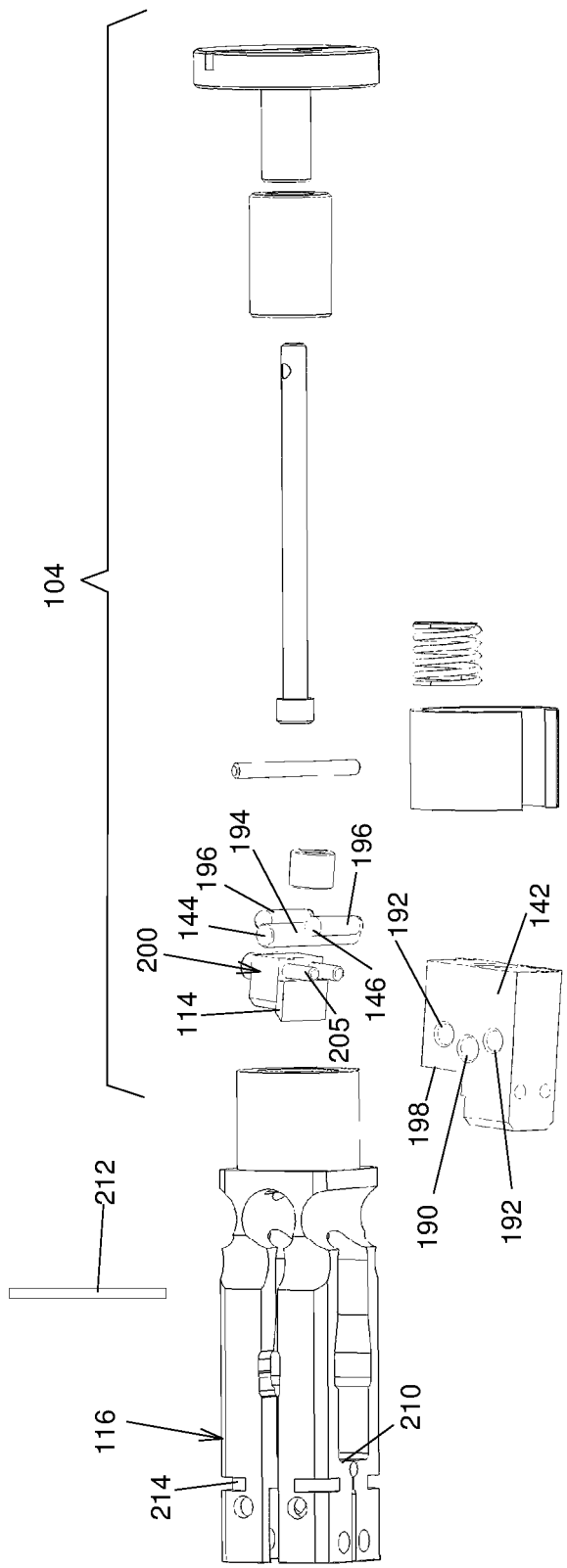
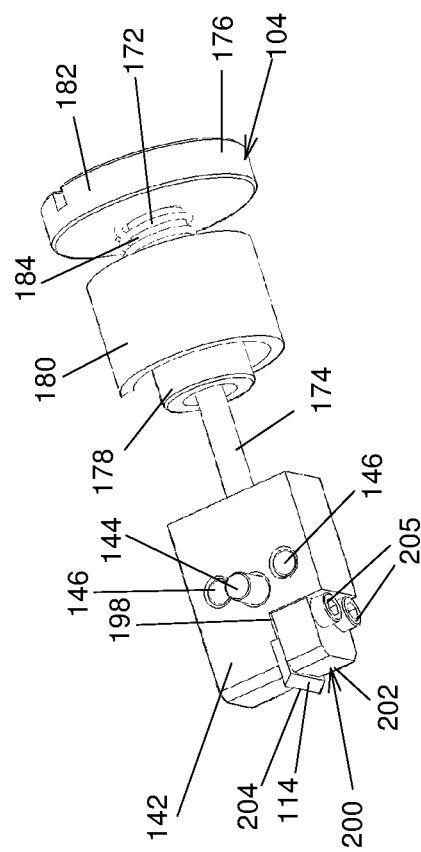
FIG. 6
FIG. 7

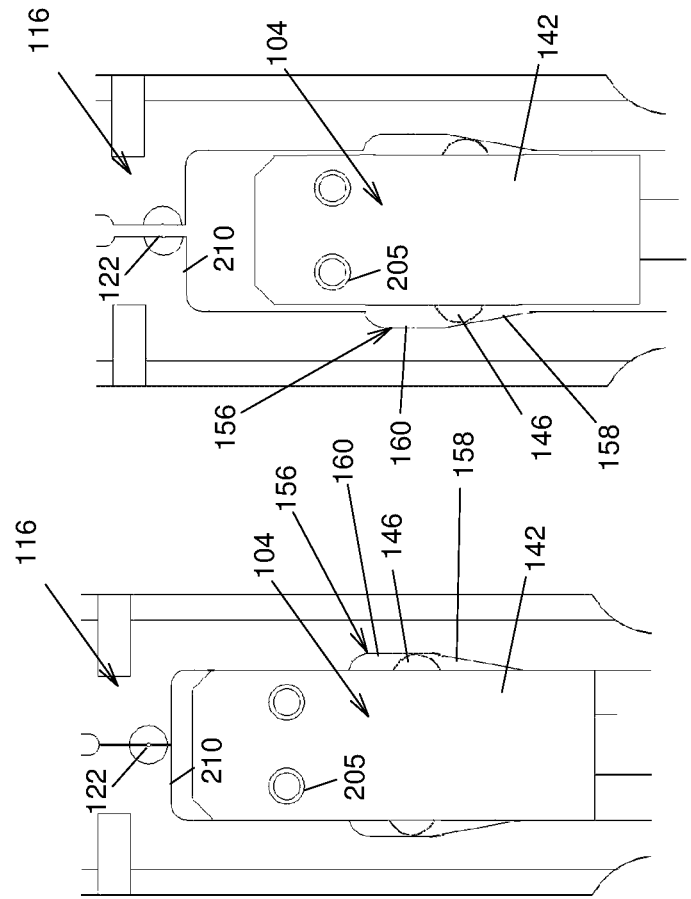
FIG. 10C
FIG. 10B
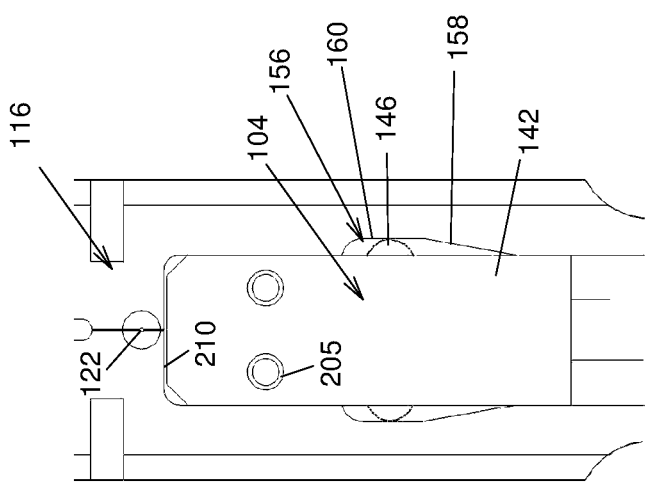
FIG. 10A

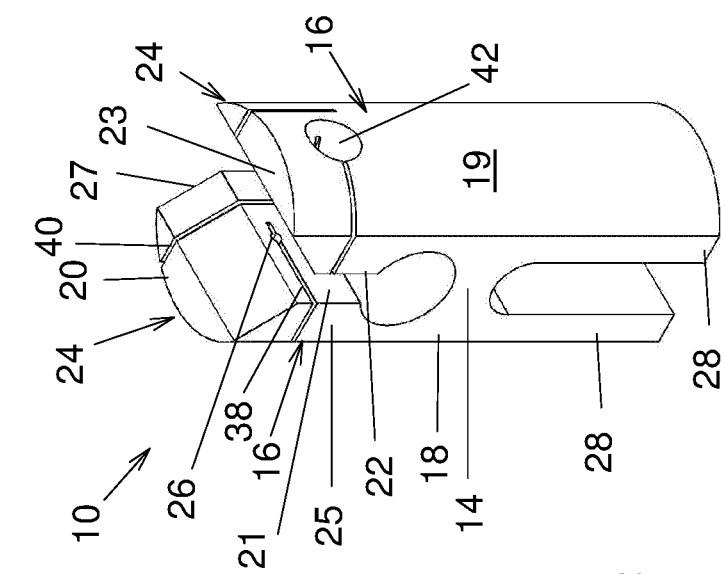
FIG. 12
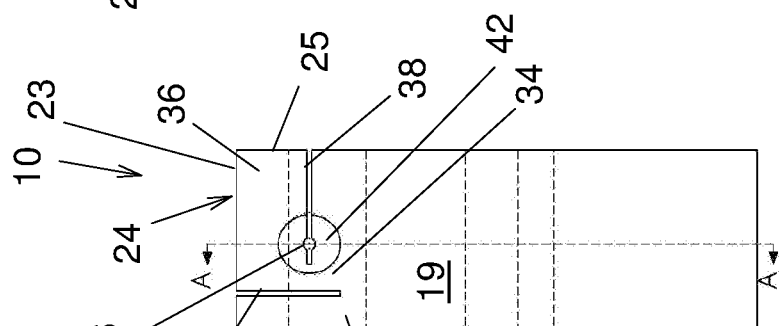
FIG. 13
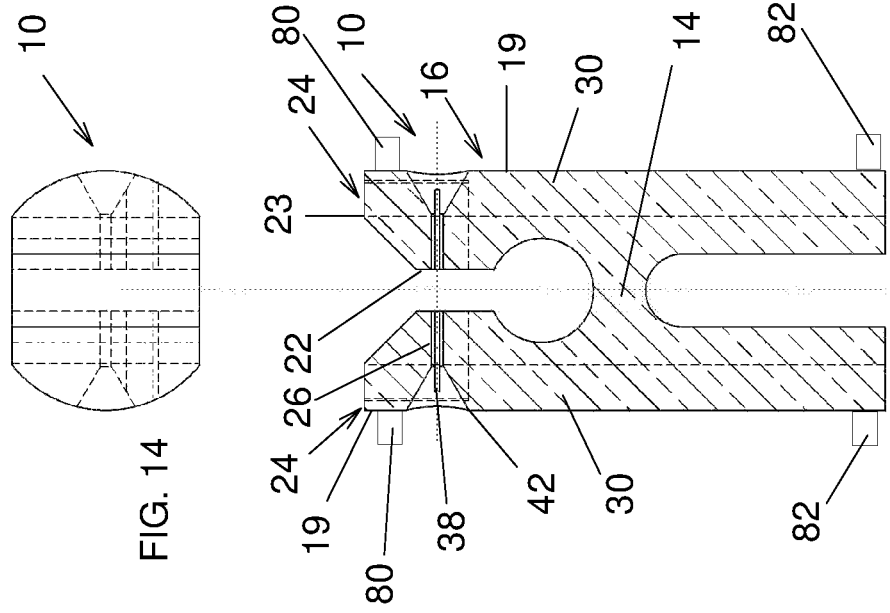
FIG. 14
FIG. 15

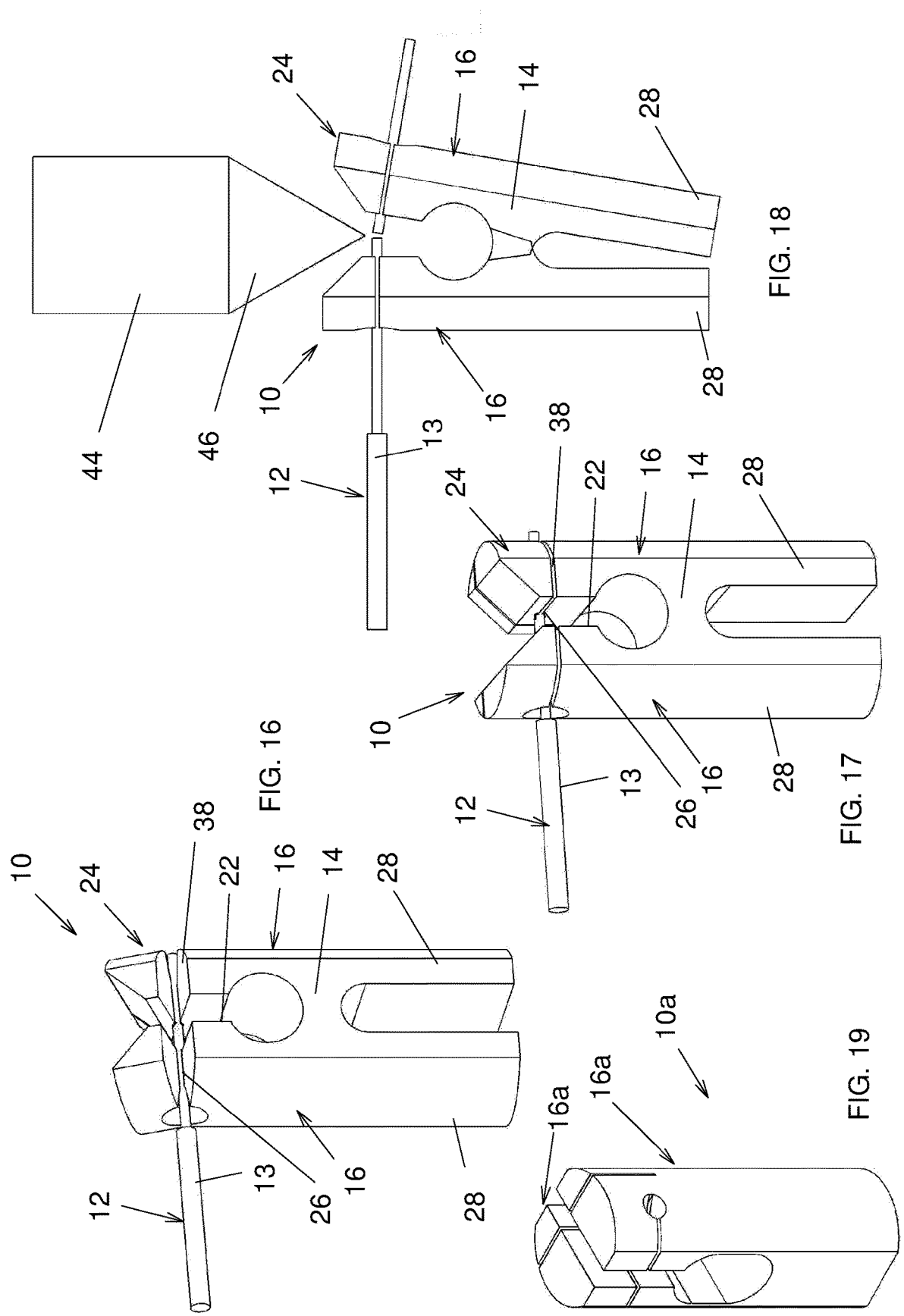

FIBER CLEAVER

FIELD OF THE INVENTION

The present invention relates to the general field or fiber optics, and more specifically to a fiber cleaver.

BACKGROUND

Optical fibers are glass wires that are very transparent and are made to guide light. A fiber is composed of a core and a cladding. Because the core has an index of refraction that is higher than that of the cladding, the light is guided in the core. The vast majority of optical fibers are made with a pure silica glass with a slightly germanium doped core. Optical fibers are made to connect light from light sources to detectors or output devices. They need to be connected to devices or to each other. Since the light exits the end of the fiber, in order to make a good connection, the end of the fiber must be properly prepared. It can be cut and polished or it can be cleaved. A cleave is achieved by applying a stress on the optical fiber, by pulling, bending or twisting, and introducing a defect on the surface of the optical fiber, for example by scribing with a blade that is harder than the glass. Because of the glass rigidity and the applied stress, the defect will propagate across the fiber, cleaving it. When properly done, this method produces a fiber's endface that is perfectly flat.

Good quality fiber cleavers, used to reliably make good quality cleaves in optical fibers, are relatively expensive and fragile. They typically require fiber clamps on both side of the cleaving point and a scribing tool that will produce the defect at the scribing point. Any non-glass protective coating on the fiber, such as the standard acrylate coating, must be removed before scribing to expose the bare fiber. Fiber cleaver design usually requires removing a relatively long portion of the optical fiber coating before cleaving. In turn, this will require a relatively bulky packaging to protect the exposed part of the fiber once subsequent operations, such as splicing or attachment of a connector, have been performed. Furthermore, good quality fiber cleavers require a stable surface to support them in use, and require fiber manipulation with both hands, which may be inconvenient. They are usually made of many different mechanical parts that are assembled precisely aligned to perform correctly, they are sensible to shock or temperature change and must be regularly realigned and calibrated, especially when they are moved around, such for fiber optics installation in the field.

Against this background, there exists a need in the industry to provide an improved fiber cleaver.

SUMMARY OF THE INVENTION

In a broad aspect, the invention provides a fiber cleaver for cleaving an optical fiber, comprising: a monobloc fiber handling element made of a single unitary and continuous piece of material, the fiber handling element defining a pair of spaced apart fiber holding portions, each fiber holding portion defining a substantially elongated fiber receiving aperture for receiving a respective part of the optical fiber thereinto, the fiber receiving apertures being distanced from each other by an inter-aperture distance in a gap extending therebetween, the fiber handling element being deformable between open, closed and tensing configurations. In the open configuration, the fiber receiving apertures extend substantially coaxially relative to each other, the fiber receiving apertures have an open width and the inter-aperture distance has a first distance value. In the closed configuration, the fiber receiving apertures have a closed width smaller than the open width and the inter-aperture distance has the first distance value. In the tensing configuration, the fiber receiving apertures have the closed width and the inter-aperture distance has a second distance value larger than the first distance value. An actuator is operatively coupled to the fiber handling element for moving the fiber handling element between the open closed and tensing configurations. A cutter is provided substantially adjacent the gap and operatively positioned for notching the optical fiber when the fiber handling element holds the optical fiber in the tensing configuration.

The invention may also provide a fiber cleaver wherein the actuator is movable along a rectilinear actuator movement axis between open, closed and tensing positions in which the fiber handling element is respectively in the open, closed and tensing configurations.

The invention may also provide a fiber cleaver wherein the fiber handling element defines a base and a pair of arms extending from the base, each of the arms defining one of the fiber holding portions opposed to the base and an arm deformable portion extending between the fiber holding portion and the base, the arm deformable portion being deformable by the actuator for varying the inter-aperture distance.

The invention may also provide a fiber cleaver wherein each fiber holding portion defines a fiber holding portion outer surface and a first slit extending between the fiber holding aperture and the fiber holding portion outer surface so that widening and narrowing the slit changes dimensions of the fiber receiving aperture to achieve the open and closed widths.

The invention may also provide a fiber cleaver further comprising a second slit extending from the fiber holding portion outer surface, the second slit being disjoint from the fiber holding aperture, wherein narrowing and widening of the first slit causes respectively widening and narrowing of the second slit.

The invention may also provide a fiber cleaver wherein the first and second slits are substantially perpendicular to each other.

The invention may also provide a fiber cleaver wherein the deformable portion is configured and sized so that the fiber receiving apertures are angled relative to each other in the tensing configuration.

The invention may also provide a fiber cleaver wherein the fiber handling element defines a base and two pairs of arms extending from the base, each pair of arms including two arms, each arm defining an arm free end opposed to the base, each of the pairs of arms jointly defining one of the fiber holding portions substantially adjacent the arm free ends, each arm defining an arm deformable portion between the fiber holding portion and the base, the arm deformable portion being deformable by the actuator for varying the inter-aperture distance and an aperture width of each fiber receiving aperture.

The invention may also provide a fiber cleaver wherein each arm defines a fiber receiving recess, the fiber receiving recesses of the arms within each of the pairs of arms facing each other and being adjacent to each other so as to together define one of the fiber receiving apertures, deforming the arms to vary a distance between the fiber receiving recesses changing the aperture width of the fiber receiving apertures.

The invention may also provide a fiber cleaver wherein the arms within each pair of arms closes against each other adjacent the fiber receiving recesses in the closed configuration.

The invention may also provide a fiber cleaver wherein each arm defines a width controlling recess, the width controlling recesses of the arms within each pair of arms facing each other and being adjacent to each other so as to together define a width controlling aperture, the width controlling aperture defining a width controlling aperture narrow portion and a width controlling aperture wide portion, the actuator including a width controlling portion inserted in the width controlling aperture, the width controlling portion being movable along the width controlling aperture between the width controlling aperture narrow portion and the width controlling aperture wide portion, the width controlling portion being configured and sized so that when the width controlling portion is respectively in the width controlling aperture narrow portion and the width controlling aperture wide portion, the fiber receiving apertures have respectively the open and closed widths.

The invention may also provide a fiber cleaver wherein the width controlling portion is wider than the width controlling aperture narrow portion and narrower than the width controlling aperture wide portion.

The invention may also provide a fiber cleaver wherein each arm defines a spacing controlling recess, the spacing controlling recesses of each arm from one of the pairs of arms facing the spacing controlling recesses of one of the arms from an other one of the pairs of arms so that the two spacing controlling recesses together define a spacing controlling aperture extending between the two pairs of arms, the spacing controlling aperture defining a spacing controlling aperture narrow portion and a spacing controlling aperture wide portion, the actuator including a spacing controlling portion inserted in the spacing controlling aperture, the spacing controlling portion being movable along the spacing controlling aperture between the spacing controlling aperture narrow portion and the spacing controlling aperture wide portion, the spacing controlling portion being configured and sized so that the inter-aperture distance is larger with the spacing controlling portion in the spacing controlling aperture narrow portion than with the spacing controlling aperture wide portion.

The invention may also provide a fiber cleaver wherein the spacing controlling aperture includes at least a portion thereof tapering towards the arm free ends.

The invention may also provide a fiber cleaver wherein the spacing controlling aperture defines a neck at the spacing controlling aperture narrow portion and an enlargement past the neck in a direction leading towards the arm free ends, the enlargement being wider than the spacing controlling portion.

The invention may also provide a fiber cleaver wherein the actuator defines an actuator body from which the spacing controlling and width controlling portions extend, the actuator body being slidably received between the arms and movable along the arms between open, closed and tensing positions. In the open position, the width controlling portion of the actuator is in the width controlling aperture narrow portion and the spacing controlling portion of the actuator is in the spacing controlling aperture wide portion. In the closed position, the width controlling portion of the actuator is in the width controlling aperture wide portion and the spacing controlling portion of the actuator is in the spacing controlling aperture wide portion. In the tensing position, the width controlling portion of the actuator is in the width controlling aperture wide portion and the spacing controlling portion of the actuator is in the spacing controlling aperture narrow portion.

The invention may also provide a fiber cleaver wherein the cutter is mounted to the actuator so as to protrude in the gap when the actuator is in the tensing position.

The invention may also provide a fiber cleaver further comprising an actuator biasing element operatively coupled to the actuator for biasing the actuator towards the open position.

The invention may also provide a fiber cleaver wherein the arms define an abutment, the actuator being configured and sized for abutting against the abutment when in the tensing position to limit movement of the cutter through the gap.

The invention may also provide a fiber cleaver further comprising an arm biasing element biasing the arms towards each other between the pairs of arms and within each pair of arms.

The invention may also provide a fiber cleaver wherein the arm biasing element includes a resiliently deformable element encircling the arms substantially adjacent the arm free ends.

The invention may also provide a fiber cleaver wherein the fiber receiving apertures are each substantially cylindrical.

The invention may also provide a fiber cleaver wherein the fiber handling element defines a recess opposed to the gap leading into at least one of the fiber receiving apertures, the recess having a substantially frusto-conical configuration tapering towards and leading to the at least one of the fiber receiving apertures.

In another broad aspect, the invention provides a fiber cleaver for cleaving an optical fiber, comprising: a monobloc fiber handling element made of a single unitary and continuous piece of material, the fiber handling element defining a base; and two pairs of arms extending away from the base, each of the pair of arms including two arms, the arms being substantially parallel to each other, each pair of arms defining between the arms within the pair of arms a fiber receiving apertures, the fiber receiving apertures of the two pairs of arms being coaxial in register with each other, the pairs of arms being separated from each other by a gap; an actuator operatively coupled to the arms for selectively spreading apart from each other the arms within each pair of arms and for selectively spreading apart from each other the two pairs of arms; and a cutter operatively positioned in the gap for selectively forming a notch in the optical fiber; wherein, in operation, spreading apart from each other the arms within each pair of arms allows insertion of the optical fiber in the fiber receiving apertures, releasing from a spread apart configuration the arms within each pair of arms grips the optical fiber and spreading apart from each other the two pairs of arms with the optical fiber gripped in the fiber receiving aperture applies a tension in the optical fiber.

The invention may also provide a fiber cleaver wherein the cutter is operatively mounted to the actuator so that when the actuator has spread apart the pairs of arms by a predetermined distance, the cutter is in register with the fiber receiving aperturess, so that when the optical fiber extends across the fiber receiving apertures, the cutter notches the optical fiber.

In yet another broad aspect, the invention provides a fiber holder for a fiber cleaver usable to hold an optical fiber and apply a tension thereto, the fiber holder comprising: a pair of arms, each arm including a fiber clamp defining a fiber receiving aperture, the arms defining a gap therebetween, the fiber receiving apertures being in register with each other across the gap; each fiber clamp being movable between an open configuration and a closed configuration, the fiber receiving apertures having a larger transversal cross-sectional area in the open configuration than in the closed configuration; wherein the arms are movable between an insertion configuration and a tension configuration, wherein, in the insertion configuration, the fiber receiving apertures are axially aligned relative to each other, and, in the tension configuration, the gap is wider than in the insertion configuration so that the fiber receiving apertures are further apart from each other.

In use, in a first embodiment, the fiber clamps are first in the closed configuration and the arms are in the insertion configuration. The fiber receiving apertures are typically cylindrical with a diameter slightly smaller than the diameter of the optical fiber to cleave. Through a suitable actuator, the fiber clamps are deformed to their open configuration, which increases the diameter of the fiber receiving aperture and allows insertion of the optical fiber therethrough, after its coating has been removed from its extremity along a suitable length. The optical fiber is inserted through both fiber receiving apertures and the actuator is used to return the fiber clamps to the closed configuration, in which the clamps firmly engage the optical fiber. The fiber clamps may be for example biased towards the closed configuration so that the only active movement is opening the clamps, the clamps being closed by simply releasing a force opening the fiber clamps.

Then, the optical fiber can be cleaved as follows. Tension is applied to the optical fiber by applying a force that would move the arms to the tension configuration. The optical fiber being very rigid, the clamps should not move significantly, for example by less than 1 percent, but will transfer the force to the optical fiber creating an axial tension in it. The retention characteristic of the clamps must be good enough so that the fiber does not split will being put under tension. The force on the cleaver arms can be performed using another actuator, or the same actuator that was used to operate the clamps but in a different position. After tension has been applied, a small defect may be created at the surface of the optical fiber, for example using a hard blade, which then propagates across its whole diameter to cleave the optical fiber. Other conventional manners of cleaving the optical fiber under tension can be used.

In another embodiment, the clamps are in an open position at the start, so that the optical fiber can be inserted after the protection coating has been removed. An actuator can then apply a force that can close the clamps and retained the optical fiber. This force can be increased to a point where the retention characteristics of the clamp will be sufficient so that the optical fiber will not slip when under tension. Another actuator, or the same actuator that was used to operate the clamps but in a different position can then be used to apply a force on the arms, creating a tension on the optical fiber. A cutter can then be used to create a defect on the fiber exposed surface between the clamps. The fiber then cleaves and the forces applied on the arms and on the clamps can be removed and the cleaved optical fiber is released.

In some embodiments, the clamps and arms are made of or include a super-elastic material so that relatively large elastic deformations can be applied thereto.

Advantageously, the proposed fiber holders and fiber handling elements can be miniaturized so that the clamps and gap are relatively small. This allows cleaving optical fibers for which only a relatively small portion of coating has been removed.

In some embodiments, the fiber handling element is monobloc. This monobloc part would elastically deform in the cleaving process, but spring back to its original shape at the end. This ensures that the two fiber holding portions are always properly aligned and produces high quality cleaves.

The present application claims priority from U.S. provisional application No. 62/350,782 filed Jun. 16, 2016, the contents of which is hereby incorporated by reference in its entirety.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

FIG. 1, in a perspective view, illustrates a fiber cleaver in accordance with an embodiment of the present invention;

FIG. 2, in a perspective view with parts removed, illustrates the fiber cleaver of FIG. 1

FIG. 3, in a front elevation view, illustrates a fiber handling element and an actuator both part of the fiber cleaver of FIGS. 1 and 2, both being part of a cleaver mechanism found inside the fiber cleaver;

FIG. 4, in a side elevation view, illustrates the fiber handling element and actuator of FIG. 3;

FIG. 5, in top plan view, illustrates the fiber handling element and actuator of FIG. 3;

FIG. 6, in an exploded perspective view, illustrates the fiber handling element and actuator of FIG. 3;

FIG. 7, in a perspective view, illustrates the actuator of FIG. 3;

FIG. 10A, in an enlarged front elevation view, illustrates part of the fiber handling element and actuator of FIG. 3, the actuator being shown in a tensing position;

FIG. 10B, in an enlarged front elevation view, illustrates part of the fiber handling element and actuator of FIG. 3, the actuator being shown in a closed position;

FIG. 10C, in an enlarged front elevation view, illustrates part of the fiber handling element and actuator of FIG. 3, the actuator being shown in an open position;

FIG. 12, in a perspective view, illustrates a fiber handling element in accordance with another embodiment of the present invention;

FIG. 13, in a front elevation view, illustrates the fiber handling element of FIG. 12;

FIG. 14, in a bottom plan view, illustrates the fiber handling element of FIG. 12;

FIG. 15, in a side cross-sectional view along section line A-A of FIG. 13, illustrates the fiber handling element of FIG. 12;

FIG. 16, in a perspective view, illustrates the fiber holder of FIG. 12 with arms thereof in an insertion configuration and fiber clamps thereof in an open configuration, an optical fiber being in the process of being inserted in the fiber clamps, the deformation of the fiber clamps being exaggerated for illustration purposes;

FIG. 17, in a perspective view, illustrates the fiber holder of FIG. 12 with the arms in the insertion configuration and the fiber clamps in a closed configuration, the optical fiber being held by the ferrules;

FIG. 18, in a side elevation view, illustrates the fiber holder of FIG. 12 with the arms in a tension configuration after the fiber has been cleaved and the fiber clamps in the closed configuration, the two pieces of cleaved optical fiber being held by the fiber clamps, the deformation of the arms being exaggerated for illustration purposes; and FIG. 19, in a perspective view, illustrates a fiber handling element in accordance with yet an other embodiment of the present invention.

DETAILED DESCRIPTION

Figure 9:
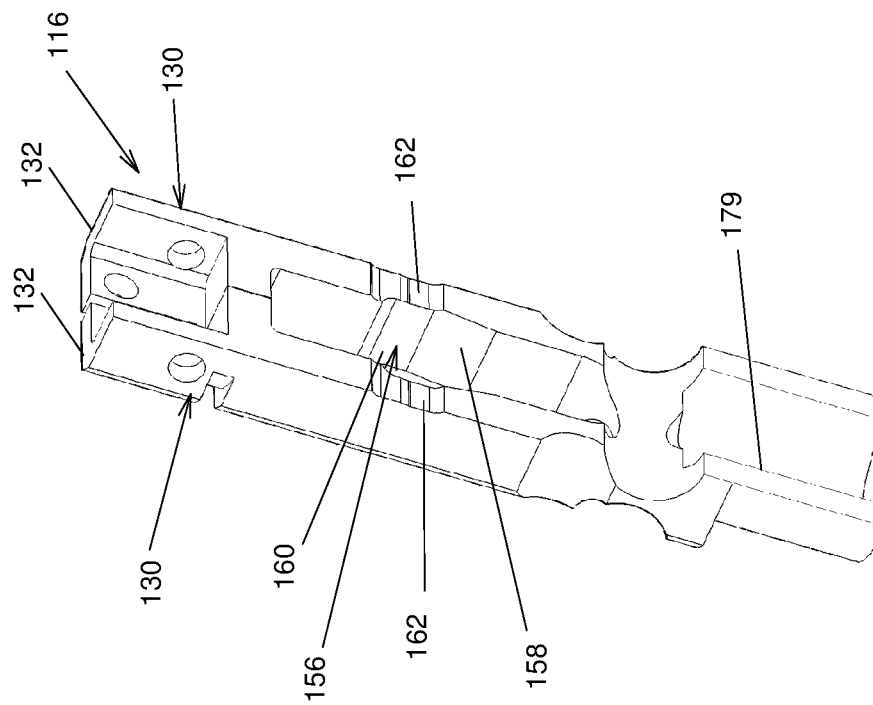
FIG. 9, in a perspective cross-sectional view along section line D-D of FIG. 3, illustrates the fiber handling element of FIG. 3.

Generally speaking, the present document proposes fiber handling elements and fiber cleavers for cleaving an optical fiber including the fiber handling element that are, in some embodiments, relatively small when compared with currently commercially available fiber cleavers.

FIG. 1 illustrates such a fiber cleaver 100 including a body 102. The fiber cleaver 100 includes also an actuator 104 that protrudes partially from the body 102 to allow access to the internal components that perform a cleave of the optical fiber 106. The body 102 includes a handle portion 108 typically configured and sized to be held in a single hand of a human operator (not shown in the drawings), and a effective portion 110 including the fiber cleaving components, further described hereinbelow. The actuator 104 protrudes in the effective portion 110. The effective portion 110 defines a pair of opposed access apertures 112 (only one of which is shown in FIG. 1) allowing insertion of the optical fiber 106 therethrough to access the internal fiber cleaving components. In some embodiments, the actuator 104 protrudes from the body 102 such that a thumb or a finger of the hand holding the handle portion 108 may operate the actuator 104 alone. Thus, the operator may hold and operate the fiber cleaver 100 with one hand and insert the optical fiber 106 through the access apertures 112 using his other hand while holding the fiber cleaver 100, without requiring a surface to support the fiber cleaver 100, which facilitates many fiber cleaving operations, which may be performed in tight spaced. It should be noted that the fiber cleaving components described hereinbelow may be contained in an alternative body having any other suitable shape, including bodies needing a surface on which to stand when the fiber cleaver is operated.

The fiber cleaving components include a cutter 114 (shown for example in FIG. 7) and a fiber handling element 116 (shown for example in FIG. 3). The cutter 114 is located inside of the fiber cutting element 116, as seen for example in FIG. 3. In FIG. 2, a body portion 118 of the body 102 is presented schematically. This body portion 118 is used for illustrative purposes, and its shape is not to be interpreted as limiting the shape of the body 102. In the fiber cleaver 100, the fiber handling element 116 is mounted inside the body 102 so as to be fixed relative thereto, for example using fasteners, pins, an adhesive or protrusions integrally formed inside the body 102. Such manners of mounting components in a body 102 are known in the art and are thus not described in further details. Also, embodiments in which the fiber cleaver 100 does not include the body 102 are also within the scope of the invention.

In some embodiments, the fiber handling element 116 is a monobloc fiber handling element 116 made of a single unitary and continuous piece of material. Monobloc, for the purpose of the present document, means that the fiber handling element 116 is made of a single piece of material, typically a metal such as Copper Beryllium, among other possibilities, without any junction of separate parts, be it through fasteners, adhesives, welding or soldering, among others. Monobloc components can be manufactured from a bloc of material through machining and/or electroerosion, among other possibilities. Monobloc components are highly advantageous as they automatically ensure proper alignment of the various parts of the components with very tight tolerances, which would be difficult to achieve otherwise. These tolerances are highly advantageous in the case of fiber cleaver 100 as they ensure that the orientation of the cleave produces is precisely controlled. They also facilitate insertion of the optical fiber 106 in the fiber handling element 116. In other embodiments however, fiber cleavers similar to the fiber cleavers proposed in the present document don't include monobloc components, but similar components that include many different sub-components joined to each other.

Referring to FIG. 2, the fiber handling element 116 defines a pair of spaced apart fiber holding portions 120, each fiber holding portion defining a substantially elongated fiber receiving aperture 122 for receiving a respective part of the optical fiber 106 thereinto. It should be noted that for a proper cleave, any sheath or coating of the optical fiber 106 is removed from its extremity before the latter is inserted in the fiber handling element 116. The fiber receiving apertures 122 are distanced from each other by an inter-aperture distance in a gap 124 (seen for example in FIG. 3) extending therebetween. The fiber receiving apertures 122 are aligned coaxially so that when the optical fiber 106 is inserted through one of the fiber receiving apertures 122, it can extend across the gap 124 and enter the other fiber receiving aperture without direct external guidance of the tip of the optical fiber 106.

In the present document, the terminology "substantially" is used to denote variations in the thus qualified terms that have no significant effect on the principle of operation of the fiber cleaver 100. These variations may be minor variations in design or variations due to mechanical tolerances in manufacturing and use of the fiber cleaver 100. These variations are to be seen with the eye of the reader skilled in the art.

The fiber handling element 116 is deformable between open, closed and tensing configurations. In the open configuration, the fiber receiving apertures 122 extend substantially coaxially relative to each other. The fiber receiving apertures 122 also have an open width and the inter-aperture distance has a first distance value. The open width is large enough to allow slidable movement of the optical fiber 106 having a predetermined fiber diameter longitudinally therealong. For the purpose of this document, the diameter of a fiber receiving aperture 122 is defined with respect to its transversal cross-sectional configuration as the largest distance that can be formed between two opposite parallel lines tangent to its boundary, and the width is defined to be the smallest such distance. In some embodiments, the fiber receiving apertures 122 are each substantially cylindrical, and the width and diameter of the fiber receiving apertures 122 are therefore identical.

In the closed configuration, the fiber receiving apertures 122 have a closed width smaller than the open width and the inter-aperture distance has the first distance value. The closed width is such that when the optical fiber 106 is inserted in the fiber receiving apertures 122, the optical fiber 106 is held thereinto with enough gripping force, through friction between the periphery of the fiber receiving apertures 122 and the optical fiber 106, to allow application of a suitable tension to the optical fiber 106. This tension is applied by moving the fiber handling element 116 to the tensing configuration in which the fiber receiving apertures 122 have the closed width and the inter-aperture distance has a second distance value larger than the first distance value. By spacing apart from each the fiber receiving apertures 122, the optical fiber 106 is slightly stretched, which applies the tension required to obtain the cleave. Typically, in addition to this relative movement between the arms, in the tensing configuration, the arms 130 are also deformed as the tensile modulus of optical fibers is relatively large. Thus, any force exerted on the arms 130 away from the fiber receiving apertures 120 to apply this tension will induce also a deformation in the arms 130.

It should be noted that all the previously described displacements and change of shape are relatively small. Indeed, the diameter of a standard telecommunication optical fiber 106 is typically 125 microns. Also, since the various configurations are achieved through deformations of the fiber handling element 116, they must be relatively small so that these deformations are elastic, and thus reversible, to allow repeated use of the fiber handling element 116. Thus, the increase in width of the fiber receiving apertures 122 in the open configuration may be of the order of a few microns, and the increase in the inter-aperture distance in the tensing configuration may be a few percent.

The actuator 104 is operatively coupled to the fiber handling element 116 for moving the fiber handling element 116 between the open closed and tensing configurations. For example, in some embodiments, the actuator 104 is movable along a rectilinear actuator movement axis, which is for example perpendicular to the optical fiber 106, between open, closed and tensing positions in which the fiber handling element 116 is respectively in the open, closed and tensing configurations. These variations in position and configuration are described in further details hereinbelow. This rectilinear motion can be achieved by pushing or pulling the actuator 104 directly, or by rotating a threaded part that engages a suitably formed threaded aperture in the actuator 104 to create this linear movement, similarly to an endless screw mechanism, among other possibilities.

The cutter 114 is provided substantially adjacent the gap 124 and operatively positioned for notching the optical fiber 106 when the fiber handling element 116 holds the optical fiber 106 in the tensing configuration. The cutter 114 is for example mounted to the actuator 104, as described in further details hereinbelow, so as to protrude in the gap 124 when the actuator 104 is in the tensing position. It should be noted again that due to the scale of the fiber cleaver 100, the cutter 114 protrudes in the gap 124 between the fiber receiving apertures 122, and more specifically, in an imaginary cylinder extending between the two fiber receiving apertures 122, only by a relatively small amount, for example one or a few microns. This is to induce a very shallow defect in the optical fiber 106 in the tensing configuration, which will propagate across the optical fiber 106 to create the cleave. These very small distances and relative deformations are difficult to illustrate realistically in the drawings, and are therefore exaggerated and illustrated in enlarged portions of the fiber cleaver 100, as further described hereinbelow, to illustrate specific aspects resulting from the changes in position of the actuator 104.

The fiber handling element 116 defines a base 126 and two pairs of arms 128 extending from the base, each pair of arms 128 including two arms 130. Each arm 130 defines an arm free end 132 opposed to the base 126. In some embodiments, the arms 130 are all substantially similar to each other, except for being mirror images of each other along planes corresponding to section lines C-C and D-D, shown in FIGS. 3 and 4. Returning to FIG. 2, each of the pairs of arms 128 jointly defining one of the fiber holding portions 120 substantially adjacent the arm free ends 132. Each arm 130 defines an arm deformable portion 134 between the fiber holding portion 120 and the base 126. The arm deformable portion 134 is deformable by the actuator 104 for varying the inter-aperture distance and an aperture width between the open and closed widths.

The arms 130 are for example disposed in a generally square or rectangular transversal configuration, each of the arms 130 occupying a corner of the square or rectangular configuration. The arm deformable portion 134 is for example preferentially deformable along two orthogonal directions, corresponding to a widening of the space between two pairs of arms 128 at the arm free end 132 and to a widening of the space between the arms 130 within each pair of arms 128 at the arm free end 132. For example, this is achieved by forming in the arm deformable portions 134 first and second narrowed portions 136 and 138. The first narrowed portion is closer to the base 126 than the second narrowed portion 138. The first and second narrowed portions 136 and 138 are each formed by one or more recesses 140 extending into the remainder of the arms 130 and having a generally arcsegment shaped transversal configuration of constant cross-section along an axis parallel to an axis joining either the two pairs of arms 128, for the second narrowed portion 138, or the two arms 130 within each pair of arms 128, for the first narrowed portion 136. The first and second narrowed portions 136 and 138 may be such that the arms 130 within each pair of arms 128 are interconnected so as to tend to move together when the pairs of arms 128 are spread apart. However other configurations, for example a single transversally isotropic narrowing of the arms 130, or arms 130 of a constant cross-section therealong, are possible in other embodiments in the arm deformable portion 134.

Referring to FIG. 7, in a specific and non-limiting embodiment of the invention, the actuator 104 defines an actuator body 142 from which spacing controlling and width controlling portions 144 and 146 protrude. For example the actuator body 142 includes four width controlling portions 146 and two spacing controlling portions, pairwise protruding opposed to each other relative to the actuator body 142, only half of which are shown in FIG. 6. The actuator body 142 is slidably received between the arms 130. The actuator body 142 is further described hereinbelow and is only briefly introduced here to facilitate comprehension of the discussion found below relating to the shape of each arm 130. Also, in alternative embodiments, the actuator 104 is provided outside of the arms 130.

Generally speaking, deformation of the arms 130 to achieve the open, closed and tensing configurations is performed in the embodiment of the invention shown in the drawings by inserting a portion of the actuator 104 between suitably formed recesses of the arms 130. In portions wherein these recesses are narrower, insertion of the suitable portion of the actuator 104 spreads apart the arms at these narrower portions, resulting in deformation of the arms 130. Typically, the actuator 104 and the arms 130 are configured and sized so that the arms 130 deform substantially similarly when the arms 130 are deformed, so that such deformations are symmetrical about the section lines A-A and B-B of FIG. 5. More details are provided hereinbelow for this mechanism.

Figure 8:
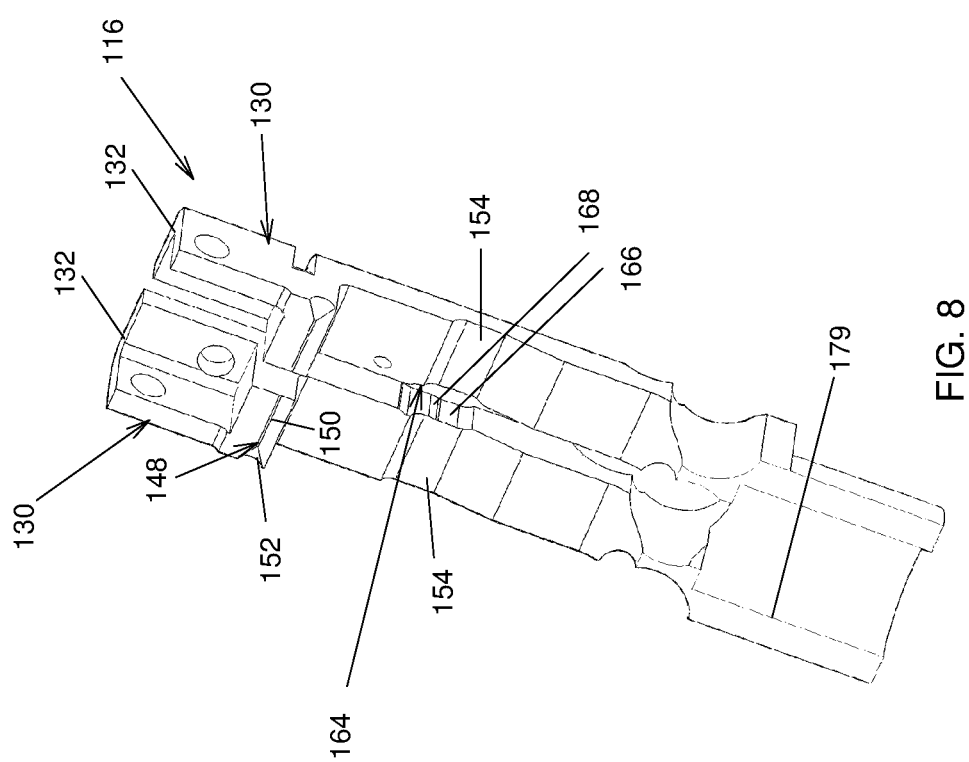
FIG. 8, in a perspective cross-sectional view along section line C-C of FIG. 4, illustrates the fiber handling element of FIG. 3.

Referring to FIG. 8, each arm 130 defines a fiber receiving recess 148. The fiber receiving recesses 148 of the arms 130 within each pair of arms 128 face each other and are adjacent to each other so as to together define one of the fiber receiving apertures 122 (not seen in FIG. 8). Deforming the arms 130 to vary a distance between the fiber receiving recesses 148 changes the aperture width of the fiber receiving apertures 122. In some embodiments, the arms 130 within each pair of arms 128 abut against each other adjacent the fiber receiving recesses 148 in the closed configuration. However, in other embodiments, there is still a small gap between the arms 130 within each pair of arms 128 adjacent the fiber receiving recesses 148 in the closed configuration.

The fiber receiving recesses 148 each include for example an internal portion 150, and which reaches the gap 124. The internal portions are elongated and substantially half-cylinder shaped. An external portion 152 extends from the internal portion 150 and tapers towards the internal portion 150. For example the external portion 152 is substantially half-cone shaped, so that two facing external portions 152 together form a frusto-conical passageway leading to the fiber receiving aperture 122 formed by two facing internal portions 150.

Each arm 130 also defines a width controlling recess 154. The width controlling recesses 154 of the arms 130 within each pair of arms 128 face each other and are adjacent to each other so as to together define a width controlling aperture 156, seen for example in FIGS. 10A, 10B and 10C. The width controlling aperture 156 defines a width controlling aperture narrow portion 158 and a width controlling aperture wide portion 160, the latter being closer to the arm free ends 132 then the former. Each width controlling portion 146 of the actuator 104 is inserted in a respective one of the width controlling recesses 154. The width controlling portions 146 are movable along the width controlling aperture 156 between the width controlling aperture narrow portion 158 and the width controlling aperture wide portion 160. The width controlling portions 146 are configured and sized so that when the width controlling portion 146 is respectively in the width controlling aperture narrow portion 158 and the width controlling aperture wide portion 160, the fiber receiving apertures 122 have respectively the open and closed widths, as seen respectively in FIGS. 10A and 10C, which illustrate the tensing and open configurations respectively, FIG. 10B illustrating the closed configuration. For example, the distance and relative position between two facing width controlling portions 146 remains constant as the actuator 104 is moved, which forces the arms 130 within each pair or arms 128 to be spread apart distally to the width controlling aperture 156 when the width controlling portions 146 are moved from the width controlling aperture wide portion 160, as seen in FIG. 10A, to the width controlling aperture narrow portion 158, as seen in FIG. 10C. In some embodiments, the total width of the actuator 104 between the tips of the width controlling portions 146 is wider than the width controlling aperture narrow portion 158 and narrower than the width controlling aperture wide portion 160.

The width controlling aperture narrow and wide portions 158 and 160 may have any suitable shape. For example, the width controlling aperture narrow and wide portions 158 and 160 are respectively rectangular and trapezoidal, the latter shape tapering towards the base 126. In this configuration, as long as the width controlling portions 146 are in the width controlling aperture wide portion 160, the width of the fiber receiving apertures 122 remains constant, which allows application of the tension in the optical fiber as described hereinbelow. When the width controlling portions 146 are moved to the width controlling aperture narrow portion 158, the fiber receiving apertures 122 gradually open as the width controlling portions 146 progress along the tapering shape of the width controlling aperture narrow portion 158.

Figure 11B:
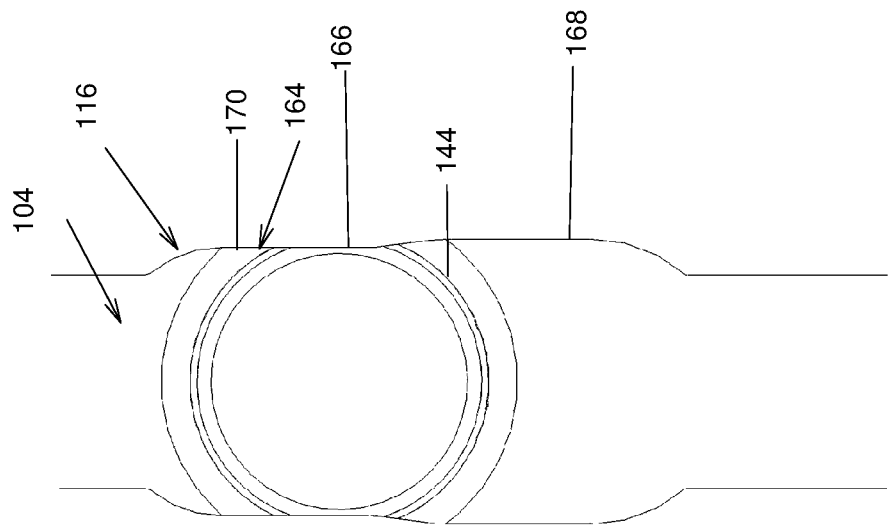
FIG. 11B, in an enlarged side elevation view, illustrates part of the fiber handling element and actuator of FIG. 3, the actuator being shown in the tensing position.
Figure 11A:
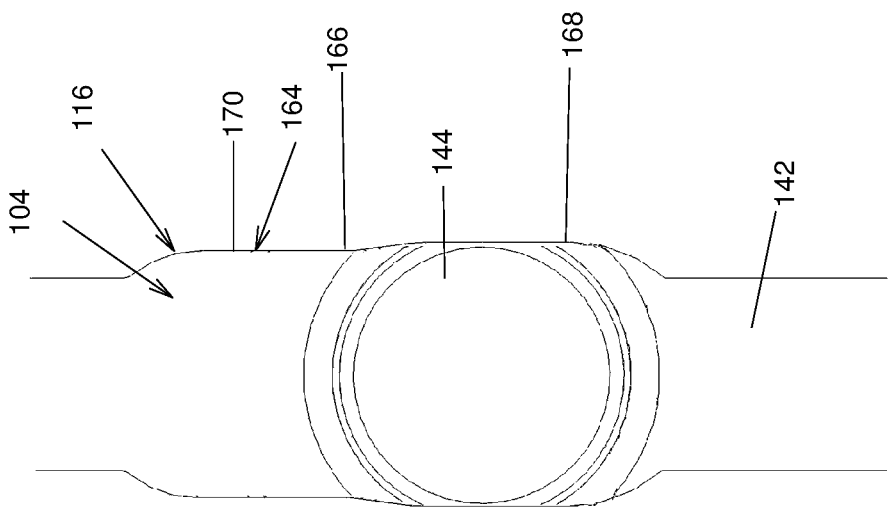
FIG. 11A, in an enlarged side elevation view, illustrates part of the fiber handling element and actuator of FIG. 3, the actuator being shown in the closed position.

Referring for example to FIG. 9, each arm 130 defines a spacing controlling recess 162. The spacing controlling recesses 162 of each arm 130 face the spacing controlling 162 recesses of one of the arms 130 from another pair of arms 128, so that the two spacing controlling recesses 162 together define a spacing controlling aperture 164, seen for example in FIGS. 8, 11A and 11B. Referring for example to FIG. 11A, the spacing controlling aperture 164 defines a spacing controlling aperture narrow portion 166 and a spacing controlling aperture wide portion 168, the former being closer to the arm free ends 132 then the latter. A respective one of the spacing controlling portions 144 is inserted between each pair of facing spacing controlling recesses 162. The spacing controlling portions 144 are movable along the spacing controlling recesses 162 between the spacing controlling aperture narrow portion 166 and the spacing controlling aperture wide portion 168. The spacing controlling portions 144 are configured and sized so that the inter-aperture distance across the gap 124 is larger with the spacing controlling portion 144 in the spacing controlling aperture narrow portion 166 than with the spacing controlling aperture wide portion 168.

Typically, the spacing controlling aperture 164 includes at least a portion thereof tapering towards the arm free ends 132 so that progression between the spacing controlling aperture narrow portion 166 and the spacing controlling aperture wide portion 168 is progressive. In some embodiments, the spacing controlling aperture 164 defines a neck at the spacing controlling aperture narrow portion 166 and an enlargement 170 past the neck in a direction leading towards the arm free ends 132. The enlargements 170 are wider than the spacing controlling portions 144. In such embodiments, the spacing controlling apertures 164 are thus generally hourglass-shaped, typically with a relatively wide neck. This shape ensures that the pairs of arms 128 cannot be spread apart by more than a predetermined distance, regulated by the width at the neck, which ensures that the tension applied to the optical fiber 106 is limited to a tension that will cause a cleave without breaking the optical fiber 106.

The remainder of the arms 130 are shaped to guide the actuator 104, and more specifically for receiving slidably the actuator body 142. For example, the arms 130 each define plane surfaces pairwise parallel to each other between adjacent arms 130 along which the actuator body 142 is slidable, and the actuator body 142 is inscribed in a parallelepiped so that its outer surface slidably engages the arms 130.

Thus, the arms 130 define between them width controlling apertures 156 and spacing controlling apertures 164, all of which have a width that varies at different longitudinal positions along the arms 130. Typically, two width controlling apertures 156 are provided, opposed to each other and similarly shaped. Each width controlling aperture 156 extends generally parallel to the fiber receiving apertures 122. Also typically, two spacing controlling apertures 164 are provided, opposed to each other and similarly shaped. Each spacing controlling apertures 164 extends generally perpendicular to the fiber receiving apertures 122. By inserting suitably dimensioned portions of the actuator 104 in the width controlling apertures 156 and spacing controlling apertures 164, the arms 130 may be moved to either widen or narrow the fiber receiving apertures 122, using the width controlling apertures 156, or to move the fiber receiving apertures 122 axially relative to each other, using the spacing controlling apertures 164. This is achieved by moving the actuator 104 along the width controlling apertures 156 and spacing controlling apertures 164.

Referring to FIG. 7, the actuator 104 includes the above-mentioned actuator body 142, along with the spacing controlling and width controlling portions 144 and 146. In addition, the actuator 104 includes an actuator biasing element 172, a plunger 174 terminated by a push button 176. In some embodiments, the push button 176 is inserted in a sleeve 178, which itself is inserted in a suitably shaped sleeve receiving aperture 179 formed in the fiber handling element opposed to the arm free ends 132, shown partially in FIGS. 8 and 9. A retention collar 180 encircles the fiber handling element 116 peripherally to the sleeve receiving aperture 179 and is inserted in a suitably shaped aperture formed in the body 102 (not shown in the drawings. However, any other manner of mounting the actuator 104 to the fiber handling element 116 is within the scope of the invention.

Generally speaking, the plunger 174 is substantially elongated and secured to the push button 176 at one end thereof and to the actuator body 142 at the other end thereof, using any suitable method known in the art. The push button 176 defines an end disc 182 from which extends coaxially a button sleeve 184 to which the plunger 174 is secured. The plunger 174 is for example secured to the actuator body 142 by being inserted in a suitable aperture thereof and welded, screwed or cold-pressed into that aperture. The sleeve 178 is substantially cylindrical and receives slidably thereinto the button sleeve 184 to allow movements of the push button 176 therealong. The actuator biasing element 172 extends between the sleeve 178 and the end disc 182 and biases the push button 176, and therefore the whole actuator 104, including the actuator body 142 though the plunger 174, away from the arm free ends 132.

The actuator body 142 is slidably received between the arms 130 and movable along the arms 130 between the open, closed and tensing positions, seen respectively in FIGS. 10A, 10B and 100. In the open position, the width controlling portions 146 are in the width controlling aperture narrow portions 158 and the spacing controlling portions 144 are in the spacing controlling aperture wide portion 168, as seen in FIG. 11A. The open position is the default position of the actuator 104 due to the effect of the actuator biasing element 172, and corresponds to a configuration in which the optical fiber 106 can move relative to the fiber cleaver 100 to be inserted thereinto or removed therefrom.

In the closed position, the width controlling portions 146 are in the width controlling aperture wide portions 160 and the spacing controlling portions 144 are still in the spacing controlling aperture wide portion 168, but closer to the spacing controlling aperture narrow portion 66. This is achieved by pressing the push button 176 partially against the action of the actuator biasing element 172. In this configuration, the optical fiber 106 is held firmly in the fiber receiving apertures 122, but no tension is exerted on the optical fiber 106.

In the tensing position, the width controlling portions 146 are in the width controlling aperture wide portion 160 and the spacing controlling portions 144 are in the spacing controlling aperture narrow portion 166. This is achieved by pressing the push button 176 further compared to the closed configuration. In this configuration, the optical fiber 106 is held firmly in the fiber receiving apertures 122 and a tension is exerted on the optical fiber 106 due to the spreading apart of the pairs of arms 128 from each other.

In some embodiments, the spacing and width controlling portions 146 and 144 are integrally formed in the actuator body 142. However, in alternative embodiments, as seen from FIG. 6, the actuator body 142 defines pin receiving apertures 190 and 192 extending therethrough for receiving pins 194 and 196. For example, the pin receiving apertures 190 and 192 are substantially perpendicular to the fiber receiving apertures 122.

The pin receiving aperture 190 is provided centrally and received thereinto the pin 194, the latter protruding from the pin receiving aperture 190 at both ends thereof. For example, the pin receiving aperture 190 and the pin 194 have a generally cylindrical configuration. The portions of the pin 194 that protrude from the pin receiving aperture 190 form the spacing controlling portions 144.

Two pin receiving apertures 192 are provided, substantially parallel to the pin receiving aperture 190, one on each side thereof. The pin receiving apertures 192 each receive thereinto one of the pins 196, the latter protruding from the pin receiving apertures 192 at both ends thereof. For example, the pin receiving aperture 192 and the pin 196 have a generally cylindrical configuration. In some embodiments, the tips of the pins 196 may have a rounded configuration, for example a substantially hemispherical configuration, to facilitate movements in the width controlling apertures 156. The portions of the pin 196 that protrude from the pin receiving apertures 192 form the width controlling portions 146.

It should be noted that while an actuator 104 including four width controlling portions 146 and two spacing controlling portions 144 has been described, actuators 114 including any suitable number of spacing and width controlling portions 146 and 146 are within the scope of the invention. For example, in some embodiments, only one arm 130 within each pair of arms 128 is deformed, which requires therefore only one width controlling portion 146 per pair of arms. Similarly, only one of the pairs of arms 128 may be deformed to achieve the tensing configuration, which would only require one spacing controlling portion 144. In addition, the orientation of the pins 194 and 196 could be rotated 90 degrees relative to their orientation in the actuator 104, which would thus require two width controlling portions 146 and four spacing controlling portions 144.

In some embodiments, the actuator body 142 is generally parallellipiped-shaped and defines a notch 198 at its end closed to the arm free ends 132. The notch 198 receives a cutter assembly 200 thereinto, as seen in FIG. 7. The cutter assembly includes a cutter support 202 which supports the cutter 114. The cutter support 202 is secured to the actuator body 142 in the notch 198, for example using fasteners 205 in the form of bolts. In such embodiments, the cutter 114 is replaceable. However, cutters permanently secured to the actuator body 142, for example using an adhesive, are within the scope of the invention. The cutter 114 defines a sharp edge 204 at its tip, which is for example rectilinear. Positioning of the cutter relative to the actuator body 142 is such that the edge 204 barely touches the optical fiber 106 in the tensing configuration.

In alternative embodiments, the cutter 114 could be static, opposed to the actuator body 142, or could be independently movable from the actuator body 142. In yet other embodiments, the cutter 114 is replaced by a blunt component in a geometry similar to the geometry described hereinabove, that would abut against the optical fiber 106 to deform it towards a stationary cutter.

In some embodiments, the arms define an abutment 210, seen for example in FIG. 6. The actuator 104 is configured and sized for abutting against the abutment 210 when in the tensing position to limit movement of the cutter 114 through the gap 124. The abutment 210 may be formed simply by a surface at the end of the spacing controlling aperture 164 that is closed to the arm free end 132 that extends generally perpendicular to the arms 130.

In some embodiments, an arm biasing element 212, seen in FIG. 6 only, biases the arms 130 towards each other between the pairs of arms 128 and within each pair of arms 128, or in other words towards the closed configuration. For example, the arm biasing element 212 takes the form of a resiliently deformable element, such as an elastomer ring, encircling the arms 130 substantially adjacent the arm free ends 132. In some embodiments, the arms 130 each define a slot 214 at the corner of the square or rectangular configuration defined by the arm to receive part of the arm biasing element 212. However, in alternative embodiments, the arm biasing element 212 is omitted and the arms 130 get to the closed configuration through the resilience of the arm deformable portions 128. FIGS. 12 to 18 illustrate a fiber handling element 10 in accordance with another embodiment of the present invention. The fiber handling element 10 is also monobloc and usable in a fiber cleaver (not shown in its entirety in the drawings). The fiber handling element 10 is usable to hold an optical fiber 12 (as shown in FIGS. 16, 17 and 18) and apply a tension thereto. With reference to FIG. 12, the fiber handling element 10 includes a base 14 and a pair of arms 16 extending from the base 14. The arms 16 each define opposed arms proximal and distal ends 18 and 20, respectively adjacent the base 14 and spaced apart from the base 14. The arms 16 define a gap 22 therebetween.

In opposition to the fiber handling element 116, the fiber handling element 10 includes only two arms 16, which are generally similar in function to the pairs of arms 128. To allow insertion of the optical fiber 12 in the fiber handling element 116, each arm 16 includes a fiber clamp 24, referred to also simply as the clamp 24, defining a fiber receiving aperture 26. Each clamp 24 forms a fiber holding portion. The fiber receiving apertures 26 of both clamps 24 are in register with each other across the gap 22 and generally axially aligned with each other and separated from each other by an inter-aperture distance. Typically, the fiber clamps 24 are provided at the arm distal ends 20.

The fiber clamps 24 are each movable between an open configuration and a closed configuration, as seen respectively in FIGS. 16 and 17 for example. The fiber receiving apertures 26 have a larger transversal cross-sectional area in the open configuration than in the closed configuration, and are thus wider in the open configuration. Typically, the fiber receiving apertures 26 are substantially cylindrical and the diameter of the fiber receiving apertures 26 is larger in the open configuration than in the closed configuration, but other fiber clamp configurations are within the scope of the invention, for example when optical fibers of non-circular transversal configurations are used. The fiber receiving apertures 26 are dimensioned so as to grip the optical fiber 12 when the latter is inserted thereinto and the fiber clamps 24 are in the closed configuration. To that effect, for example, the diameter of the fiber receiving apertures 26 is a few percent smaller than the diameter of the cladding of the optical fiber 12 when the fiber clamps are in the closed configuration. To allow insertion of the optical fiber 12 thereinto, the fiber receiving apertures 26 have a diameter larger than the diameter of the cladding of the optical fiber 12 when the fiber clamps 24 are in the open configuration.

The arms 16 are movable between an insertion configuration and a tension configuration, shown respectively in FIGS. 17 and 18 for example. In the insertion configuration, the fiber receiving apertures 26 are axially aligned relative to each other and correspond to the position of the arms 130 in the open and closed configurations for the fiber handling element 116. In the tension configuration, if no fiber were inserted in the fiber clamps 24 to prevent movement of the arms, the gap 22 would be slightly wider than in the insertion configuration so that the fiber receiving apertures 26 are axially further apart from each other than in the insertion configuration and correspond to the position of the arms 130 in the tensing configuration for the fiber handling element 116.

Returning to FIG. 12, each arm 16 defines an arm outer surface 19 and an opposed arm inner surface 21. The fiber receiving aperture 26 extends between the arm outer and inner surfaces 19 and 21. Each arm 16 also ends with an arm distal end surface 23, which extends between the arm outer and inner surfaces 19 and 21 at the arm distal end 20. Arm side surfaces 25 and 27 each extend from the arm distal end surface 23 between the arm outer and inner surfaces 19 and 21. The gap 22 is created between the arm inner surfaces 21 of the two arms 16.

The base 14 may have any suitable shape and its purpose in the fiber handling element 10 is to support the arms 16. In some embodiments, as in the fiber handling element 10, a pair of legs 28 extend from the base 14 opposed to the arms 16. For example, each leg 28 is in prolongation one of the arms 16 relative to the base 14 and the base 14 is relatively thin so that pivoting the legs 28 causes corresponding pivotal movements of the arms 16 in the opposite direction, similarly to a clothes-pin. However, in other embodiments, as seen for example in the fiber handling element 10a of FIG. 19, the legs 28 are omitted and the tension is produced by insertion a pin between the two arms 16.

Referring for example to FIG. 15, the arms 16 are substantially elongated and each include a spacing segment 30 between the base 14 and the clamp 24. The spacing segment 30 is typically thinner than the clamp 24 to be more easily deformable so that when the arms 16 are moved apart from each other, most of the deformation occurs in the spacing segment 30, as opposed to occurring in the clamp 24, or in the base 14. Therefore, the spacing segment is an arm deformable portion.

Referring to FIG. 13, the fiber clamps 24 each include a clamp base portion 32, a clamp hinge portion 34 and a clamp mobile portion 36. The clamp base portion 32 is fixed relative to the spacing segment 30 and may, for example, extend integrally therefrom. The clamp mobile portion 36 is movable relative to the clamp base portion 32 and moves relative thereto when the clamp 24 moves between the open and closed configurations. The clamp hinge portion 34 is between the clamp mobile portion 36 and the clamp base portion 32 and is elastically deformable to allow movements of the clamp mobile portion 36 relative to the clamp base portion 32 when pressure is applied on the arm side surface 25 at the location of the clamp 24. The fiber receiving aperture 26 is between the clamp base and mobile portions 32 and 36, for example substantially adjacent the clamp hinge portion 34.

In a specific embodiment of the invention, the clamp hinge and mobile portions 34 and 36 are created by a pair of slits 38 and 40 and the fiber receiving aperture 26. More specifically, the clamps 24 are each created from a solid block of material in which the slits 38 and 40 and the fiber receiving aperture 26 are formed, for example through machining. The slits 38 and 40 are for example substantially perpendicular to each other and formed in planes that intersect each other in the clamp hinge portion 34. However, other spatial configurations for the slits 38 and 40 are within the scope of the invention.

Both slits 38 and 40 extend from the peripheral surface of the clamp 24, or in other words from a fiber holding portion outer surface. More specifically, the first slit 38 extends between the arm inner and outer surfaces 21 and 19 and between the arm side surface 25 and the fiber receiving aperture 26, which has its longitudinal axis in the same plane as the first slit 38. In some embodiments, the first slit 38 also extends past the fiber receiving aperture 26. Thus, applying pressure widening the first slit 38 by moving the clamp mobile portion 36 widens the fiber receiving aperture 26. The second slit 40 is parallel to the longitudinal axis of the fiber receiving aperture 26, spaced apart therefrom. The second slit 40 extends also between the arm inner and outer surfaces 21 and 19, but originates at the arm distal end surface 23. Due to their configurations, the first and second slits 38 and 40 have widths that move in opposite directions when the clamp mobile portion 36 is moved. More specifically, widening the first slit 38 results in narrowing of the second slit 40, and vice-versa. The second slit 40 also acts as a stopper that prevents the first slit 38 to be open too wide, which would bring the clamp hinge portion 34 to be deformed past its elastic limit. The second slit 40 is disjoint from the fiber receiving aperture 26. Thus the clamp 24 is opened when pressure is applied on the arm side surface 25 at the portion thereof adjacent the clamp 24 and the clamp 24 springs back into its closed position when the pressure is removed.

Referring to FIG. 15, in some embodiments, a guiding recess 42 extends in the arm outer surface 19 to the fiber receiving aperture 26, tapering towards the latter. Since the fiber receiving aperture 26 is typically of small dimensions, the guiding recess 42 facilitates insertion of the optical fiber 12 in the fiber receiving aperture 26. For example, the guiding recess 42 is frusto-conical. In another embodiment, the slit 40 can be made of a different width in each arm, allowing one of the clamps 24 to open to a greater extent than the other one of the clamps 24. This allows a certain guiding of the optical fiber 12 when it is inserted in the clamps 24 as the fiber receiving aperture 26 in which the optical fiber 12 is first inserted is then narrower than the other fiber receiving aperture 26.

The gap 22 is defined between the two arm inner surfaces 21. The gap 22 is typically relatively narrow between the clamps 24 and wider between the spacing segments 30. For example, the gap 22 is of substantially keyhole shaped cross-sectional configuration with a transversal cross-section having, for example, a relatively narrow rectangular portion between the clamps 24 and a generally oval, elliptical or disc-shaped portion between the spacing segments 30. The cross-section for example has a configuration that does not vary between the arm side surfaces 25 and 27. When the gap 22 includes the oval-shaped or elliptical-shaped portion, inserting an oval mandrel thereinto allows controlling the space between the arms 16 through rotation of the mandrel if the dimensions of the gap 22 and mandrel are commensurate and suitably selected.

In some embodiments, the gap 22 tapers gradually along a portion thereof from the arm distal ends 20 towards the spacing segment 30, which may be useful to allow clearance for a cutter support 44 that supports a cutter 46 to insert in the gap 22 adjacent the optical fiber 12 held in the fiber receiving aperture 26, as seen in FIG. 18. However, in other embodiments, this tapering is omitted, as seen in FIG. 19 for the fiber handling element 10a. An hybrid between the fiber handling elements 10 and 10a in which the tapering is omitted in the fiber handling element 10, as in the fiber 10a, is also within the scope of the invention.

In use, the clamps 24 are first in the closed configuration and the arms 16 are in the insertion configuration, as seen in FIG. 12. Through a suitable actuator, for example represented schematically a first actuating element 80, the clamps 24 are deformed by applying pressure on the arm side surfaces 25 at the location of the clamps 24 to their open configuration as seen in FIG. 16, which increases the diameter of the fiber receiving aperture 26 and allows insertion of the optical fiber 12 therethrough, after its coating 13 has been removed from its extremity along a suitable length. The optical fiber 12 is inserted through both fiber receiving apertures 26 and the actuator is used to return the clamps 24 to the closed configuration, as seen in FIG. 17, in which the clamps firmly engage the optical fiber 12. The clamps 24 may be for example biased towards the closed configuration so that the only active movement is opening of the clamps 24, closing being obtained by simply releasing a force opening the clamps.

Then, the optical fiber 12 can be cleaved as follows. As seen in FIG. 18, tension is applied to the optical fiber 12 by applying pressure on the the arms 16 to the tension configuration, for example using a pair of second actuating elements that are biased towards each other and provided at the distal end of the legs 28. Because the optical fiber 12 is firmly held by the clamps 24, the arms 16 may not physically move to any significant degree, but they will apply a longitudinal tension on the optical fiber 12. The only movement of the arms 16 would be due to a slight stretching of the fiber, typically less than 1% across the gap 22, due to the applied tension. After tension has been applied, a small defect may be created at the surface of the optical fiber 12, for example by scribing the optical fiber 12 with a hard cutter 46, which then propagates across its whole diameter to cleave the optical fiber. Other conventional manners of cleaving the fiber under tension can also be used. This cleaving of the optical fiber 12 will allow the arms 16 to move slightly.

In the fiber handling element 10, the arms 16 are spread apart to induce tension in the optical fiber 12 by pivoting about the base 14. This movement can be induced by pinching the legs 28 towards each other. However, in alternative embodiments, as in the fiber handling element 10a of FIG. 9, the legs 28 are omitted and the actuator moves the arms 16a directly. Therefore, the deformable portion 30 is configured and sized so that the fiber receiving apertures 26 are angled relative to each other in the tensing configuration.

The actuator required to operate the fiber handling element 10 is not shown in details. However, such an actuator is shown schematically in FIG. 15 and includes a pair of first actuating elements 80 and a pair of second actuating element 82. The first actuating elements 80 can be biased towards each other to open the clamps 24, and the second actuating elements 82 may be biased towards each other to achieve the tension configuration.

It should be noted that the actual deformations of the fiber handling element 10 in operation are relatively small and have been exaggerated in the drawings for illustrative purposes.

Although the present invention has been described hereinabove by way of preferred embodiments thereof, it can be modified without departing from the spirit and nature of the subject invention as defined in the appended claims.

What is claimed is:

1. A fiber cleaver for cleaving an optical fiber, comprising:
a monobloc fiber handling element made of a single unitary and continuous piece of material, the fiber handling element defining a pair of spaced apart fiber holding portions, each fiber holding portion defining an elongated fiber receiving aperture for receiving a respective part of the optical fiber thereinto, the fiber receiving apertures being distanced from each other by an inter-aperture distance in a gap extending therebetween, the fiber handling element being deformable between open, closed and tensing configurations, wherein
in the open configuration, the fiber receiving apertures extend coaxially relative to each other, the fiber receiving apertures have an open width and the inter-aperture distance has a first distance value;
in the closed configuration, the fiber receiving apertures have a closed width smaller than the open width and the inter-aperture distance has the first distance value; and
in the tensing configuration, the fiber receiving apertures have the closed width and the inter-aperture distance has a second distance value larger than the first distance value;
the fiber receiving apertures are configured so that a periphery thereof engages the optical fiber on opposite sides of the optical fiber to grip the optical fiber in the fiber receiving aperture in the closed and tensing configurations;
a single actuator operatively coupled to the fiber handling element, motion of the single actuator along a first direction causing the fiber handling element to move between the open, closed and tensing configurations; and
a cutter provided adjacent the gap and operatively positioned for notching the optical fiber when the fiber handling element holds the optical fiber in the tensing configuration.

2. The fiber cleaver as defined in claim 1, wherein the actuator is movable along a rectilinear actuator movement axis between open, closed and tensing positions in which the fiber handling element is respectively in the open, closed and tensing configurations.

3. The fiber cleaver as defined in claim 1, wherein the fiber handling element defines a base and a pair of arms extending from the base, each of the arms defining one of the fiber holding portions opposed to the base and an arm deformable portion extending between the fiber holding portion and the base, the arm deformable portion being deformable by the actuator for varying the inter-aperture distance.

4. The fiber cleaver as defined in claim 3, wherein each fiber holding portion defines a fiber holding portion outer surface and a first slit extending between the fiber receiving aperture and the fiber holding portion outer surface so that widening and narrowing the slit changes dimensions of the fiber receiving aperture to achieve the open and closed widths.

5. The fiber cleaver as defined in claim 4, further comprising a second slit extending from the fiber holding portion outer surface, the second slit being disjoint from the receiving, wherein narrowing and widening of the first slit causes respectively widening and narrowing of the second slit.

6. The fiber cleaver as defined in claim 5, wherein the first and second slits are perpendicular to each other.

7. The fiber cleaver as defined in claim 3, wherein the deformable portion is configured and sized so that the fiber receiving apertures are angled relative to each other in the tensing configuration.

8. The fiber cleaver as defined in claim 1, wherein the fiber handling element defines a base and two pairs of arms extending from the base, each pair of arms including two arms, each arm defining an arm free end opposed to the base, each of the pairs of arms jointly defining one of the fiber holding portions adjacent the arm free ends, each arm defining an arm deformable portion between the fiber holding portion and the base, the arm deformable portion being deformable by the actuator for varying the inter-aperture distance and an aperture width of each fiber receiving aperture.

9. The fiber cleaver as defined in claim 8, wherein each arm defines a fiber receiving recess, the fiber receiving recesses of the arms within each of the pairs of arms facing each other and being adjacent to each other so as to together define one of the fiber receiving apertures, deforming the arms to vary a distance between the fiber receiving recesses changing the aperture width of the fiber receiving apertures.

10. The fiber cleaver as defined in claim 9, wherein the arms within each pair of arms closes against each other adjacent the fiber receiving recesses in the closed configuration.

11. The fiber cleaver as defined in claim 10, wherein each arm defines a width controlling recess, the width controlling recesses of the arms within each pair of arms facing each other and being adjacent to each other so as to together define a width controlling aperture, the width controlling aperture defining a width controlling aperture narrow portion and a width controlling aperture wide portion, the actuator including a width controlling portion inserted in the width controlling aperture, the width controlling portion being movable along the width controlling aperture between the width controlling aperture narrow portion and the width controlling aperture wide portion, the width controlling portion being configured and sized so that when the width controlling portion is respectively in the width controlling aperture narrow portion and the width controlling aperture wide portion, the fiber receiving apertures have respectively the open and closed widths.

12. The fiber cleaver as defined in claim 11, wherein the width controlling portion is wider than the width controlling aperture narrow portion and narrower than the width controlling aperture wide portion.

13. The fiber cleaver as defined in claim 9, wherein each arm defines a spacing controlling recess, the spacing controlling recesses of each arm from one of the pairs of arms facing the spacing controlling recesses of one of the arms from an other one of the pairs of arms so that the two spacing controlling recesses together define a spacing controlling aperture extending between the two pairs of arms, the spacing controlling aperture defining a spacing controlling aperture narrow portion and a spacing controlling aperture wide portion, the actuator including a spacing controlling portion inserted in the spacing controlling aperture, the spacing controlling portion being movable along the spacing controlling aperture between the spacing controlling aperture narrow portion and the spacing controlling aperture wide portion, the spacing controlling portion being configured and sized so that the inter-aperture distance is larger with the spacing controlling portion in the spacing controlling aperture narrow portion than with the spacing controlling aperture wide portion.

14. The fiber cleaver as defined in claim 13, wherein the spacing controlling aperture includes at least a portion thereof tapering towards the arm free ends.

15. The fiber cleaver as defined in claim 14, wherein the spacing controlling aperture defines a neck at the spacing controlling aperture narrow portion and an enlargement past the neck in a direction leading towards the arm free ends, the enlargement being wider than the spacing controlling portion.

16. The fiber cleaver as defined in claim 13, wherein the actuator defines an actuator body from which the spacing controlling and width controlling portions extend, the actuator body being slidably received between the arms and movable along the arms between open, closed and tensing positions, wherein:
in the open position, the width controlling portion of the actuator is in the width controlling aperture narrow portion and the spacing controlling portion of the actuator is in the spacing controlling aperture wide portion;
in the closed position, the width controlling portion of the actuator is in the width controlling aperture wide portion and the spacing controlling portion of the actuator is in the spacing controlling aperture wide portion; and
in the tensing position, the width controlling portion of the actuator is in the width controlling aperture wide portion and the spacing controlling portion of the actuator is in the spacing controlling aperture narrow portion.

17. The fiber cleaver as defined in claim 16, wherein the cutter is mounted to the actuator so as to protrude in the gap when the actuator is in the tensing position.

18. The fiber cleaver as defined in claim 17, further comprising an actuator biasing element operatively coupled to the actuator for biasing the actuator towards the open position and an arm biasing element biasing the arms towards each other between the pairs of arms and within each pair of arms, wherein
the actuator is movable along a rectilinear actuator movement axis between open, closed and tensing positions in which the fiber handling element is respectively in the open, closed and tensing configurations;
the arms within each pair of arms closes against each other adjacent the fiber receiving recesses in the closed configuration;
each arm defines a width controlling recess, the width controlling recesses of the arms within each pair of arms facing each other and being adjacent to each other so as to together define a width controlling aperture, the width controlling aperture defining a width controlling aperture narrow portion and a width controlling aperture wide portion, the actuator including a width controlling portion inserted in the width controlling aperture, the width controlling portion being movable along the width controlling aperture between the width controlling aperture narrow portion and the width controlling aperture wide portion, the width controlling portion being configured and sized so that when the width controlling portion is respectively in the width controlling aperture narrow portion and the width controlling aperture wide portion, the fiber receiving apertures have respectively the open and closed widths;
the width controlling portion is wider than the width controlling aperture narrow portion and narrower than the width controlling aperture wide portion,
the arms define an abutment, the actuator being configured and sized for abutting against the abutment when in the tensing position to limit movement of the cutter through the gap; and
the fiber receiving apertures are each cylindrical.

19. The fiber cleaver as defined in claim 16, further comprising an actuator biasing element operatively coupled to the actuator for biasing the actuator towards the open position.

20. The fiber cleaver as defined in claim 16, wherein the arms define an abutment, the actuator being configured and sized for abutting against the abutment when in the tensing position to limit movement of the cutter through the gap.

21. The fiber cleaver as defined in claim 8, further comprising an arm biasing element biasing the arms towards each other between the pairs of arms and within each pair of arms.

22. The fiber cleaver as defined in claim 21, wherein the arm biasing element includes a resiliently deformable element encircling the arms substantially adjacent the arm free ends.

23. The fiber cleaver as defined in claim 1, wherein the fiber receiving apertures are each cylindrical.

24. The fiber cleaver as defined in claim 23, wherein the fiber handling element defines a recess opposed to the gap leading into at least one of the fiber receiving apertures, the recess having a frusto-conical configuration tapering towards and leading to the at least one of the fiber receiving apertures.

25. A fiber cleaver for cleaving an optical fiber, comprising:
a monobloc fiber handling element made of a single unitary and continuous piece of material, the fiber handling element defining
a base; and
two pairs of arms extending away from the base, each of the pair of arms including two arms, the arms being parallel to each other, each pair of arms defining between the arms within the pair of arms a fiber receiving aperture, the fiber receiving apertures of the two pairs of arms being coaxial in register with each other when the pairs of arms are undeformed, the pairs of arms being separated from each other by a gap;
an actuator operatively coupled to the arms for selectively spreading apart from each other the arms within each pair of arms and for selectively spreading apart from each other the two pairs of arms; and
a cutter operatively positioned in the gap for selectively forming a notch in the optical fiber;
wherein, in operation, spreading apart from each other the arms within each pair of arms allows insertion of the optical fiber in the fiber receiving apertures, releasing from a spread apart configuration the arms within each pair of arms grips the optical fiber and spreading apart from each other the two pairs of arms with the optical fiber gripped in the fiber receiving aperture applies a tension in the optical fiber.

26. The fiber cleaver as defined in claim 25, wherein the cutter is operatively mounted to the actuator so that when the actuator has spread apart the pairs of arms by a predetermined distance, the cutter is in register with the fiber receiving aperturess, so that when the optical fiber extends across the fiber receiving apertures, the cutter notches the optical fiber.

* * * * *